(12) United States Patent
Kim

(10) Patent No.: US 7,054,370 B2
(45) Date of Patent: May 30, 2006

(54) APPARATUS AND METHOD OF TRANSCODING VIDEO SNAP IMAGE

(75) Inventor: Eung Tae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 618 days.

(21) Appl. No.: 10/122,721

(22) Filed: Apr. 16, 2002

(65) Prior Publication Data

US 2002/0196847 A1   Dec. 26, 2002

(30) Foreign Application Priority Data

Jun. 23, 2001   (KR) ............................ 2001-36038

(51) Int. Cl.
*H04N 7/18*   (2006.01)

(52) U.S. Cl. ............................ 375/240.25; 375/240.26

(58) Field of Classification Search ........... 375/240.25, 375/240.26, 240.2

See application file for complete search history.

(56) References Cited

U.S. PATENT DOCUMENTS 5,262,854 A * 11/1993 Ng ........................ 375/240.24
5,455,629 A * 10/1995 Sun et al. ............... 375/240.27
5,875,039 A *  2/1999 Ohsawa et al. ............ 382/248
6,058,141 A *  5/2000 Barger et al. .............. 375/240

* cited by examiner

*Primary Examiner*—Andy Rao
(74) *Attorney, Agent, or Firm*—Fleshner & Kim, LLP

(57) ABSTRACT

An apparatus and method of transcoding a video snap image is disclosed. The apparatus includes a video decoder for performing a variable length decoding (VLD), inverse discrete cosine transform (IDCT), and inverse quantization with respect to an input bit stream to display the decoded bit stream, a DC extraction section for extracting DC components from discrete cosine transform (DCT) coefficients of variable-length-decoded macro blocks, an adder for averaging the extracted DC components, a differential pulse code modulation (DPCM) section for obtaining and outputting a difference value between the DC component averaged by the adder or the DC component outputted from the DC extraction section and a DC component of a previous macro block, a Huffman encoding section for Huffman-encoding the difference value outputted from the DPCM section, and a storage device for storing a Huffman-encoded snap image and the video bit stream.

26 Claims, 4 Drawing Sheets

MPEG-2 frame       transcoded frame

APPARATUS AND METHOD OF TRANSCODING VIDEO SNAP IMAGE

This application claims the benefit of the Korean Application No. P2001-36038 filed on Jun. 23, 2001, which is hereby incorporated by reference.

BACKGROUND OF THE INVENTION

1. Field of the Invention

The present invention relates to a video transcoding apparatus for a digital television (TV) receiver or a digital video appliance, and more particularly, to an apparatus and method of transcoding a video snap image.

2. Discussion of the Related Art

Recently, to reduce the storage and transmission capacity of digital video and audio signals, an MPEG encoder has been used.

Especially, as diverse applications such as a video search, picture-in-picture (PIP), video combining, video editing, conversion of transmission bit rate, etc., are required with respect to a compressed bit stream, there has been a demand for video transcoding methods that convert a specified bit rate of the MPEG bit stream into another bit rate.

For example, such video transcoding methods may convert an MPEG-2 bit stream into a bit stream of H.263, convert a digital video (DV) format that is a digital output of a digital camcoder into an MPEG bit stream, or convert a high-definition (HD)-class MPEG bit stream of a high picture quality into a standard definition (SD)-class MPEG bit stream of a low picture quality.

Generally, the above-described transcoders adopt encoding methods in which an MPEG decoder reduces the bit rate of the bit stream, and then the bit stream is encoded to the MPEG bit stream.

However, if it is required to search contents of the MPEG bit stream after the MPEG bit stream is stored in a storage device such as a hard disc drive (HDD), the search should be performed after the whole contents of the HD-class MPEG bit stream is decoded, and this causes the search to be inconvenient and to take a lot of time.

SUMMARY OF THE INVENTION

Accordingly, the present invention is directed to an apparatus and method of transcoding a video snap image that substantially obviates one or more problems due to limitations and disadvantages of the related art.

An object of the present invention is to provide an apparatus and method of transcoding a video snap image that can easily and rapidly search contents of an MPEG stream stored in a storage device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for transcoding a video snap image includes a video decoder for performing a variable length decoding (VLD), inverse discrete cosine transform (IDCT), and inverse quantization with respect to an input bit stream to display the decoded bit stream, a DC extraction section for extracting DC components from discrete cosine transform (DCT) coefficients of variable-length-decoded macro blocks, an adder for averaging the extracted DC components, a differential pulse code modulation (DPCM) section for obtaining and outputting a difference value between the DC component averaged by the adder or the DC component outputted from the DC extraction section and a DC component of a previous macro block, a Huffman encoding section for Huffman-encoding the difference value outputted from the DPCM section, and a storage device for storing a Huffman-encoded snap image and the video bit stream.

Here, the DCT coefficients used for extracting the DC components through the DC extraction section is DCT coefficients of an intra (I)-picture, and the DPCM section performs the DPCM in the unit of a slice.

The video bit stream and the snap image bit stream to be stored in the storage device are connected together to be stored as one signal train, and are discriminated from each other using an unused extension_start_code_identifier on an MPEG-2 syntax. The bit stream of the snap image to be stored in the storage device is composed of an image size, positional information of each slice, data length, and video snap data in the unit of a Huffman-encoded slice.

Also, the video bit stream to be stored in the storage device is composed of a presentation time stamp (PTS) and a video elementary stream (ES).

If a user selects the snap image being displayed, the video decoder decodes and displays the video bit stream stored in the next position of the snap image being displayed, and confirms the extension_start_code_identifier from the input video bit stream. Then, if the identifier is an identifier that is not used on the MPEG syntax, the video decoder skips the video bit stream indicated by the identifier without decoding the bit stream.

In another aspect of the present invention, a method of transcoding a video snap image includes the steps of variable-length-decoding an input video bit stream in the unit of a macro block, extracting DC components from discrete cosine transform (DCT) coefficients of variable-length-decoded macro blocks, obtaining a difference value between the extracted DC component and a DC component of a previous macro block, and Huffman-encoding the difference value.

Here, the step of obtaining the difference value between the extracted DC component and the DC component of the previous macro block includes the steps of if the extracted DC component corresponds to a luminance, averaging the extracted DC components of the luminance and then obtaining the difference value between the averaged DC component of the luminance and the DC component of the luminance of the previous macro block, and if the extracted DC component corresponds to a color, obtaining the difference value between the extracted DC component of the color and the DC component of the color of the previous macro block.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention is to rapidly search contents of an image or to easily search and reproduce the desired video contents when a digital video sequence of a large capacity is searched and reproduced after it is stored.

For this, the present invention proposes a bit stream structure for storage in that the original video bit stream is converted into a DC image of a small size for a video snap, and the DC image is compressed and stored, so that the stored contents can be easily searched.

Figure 1:
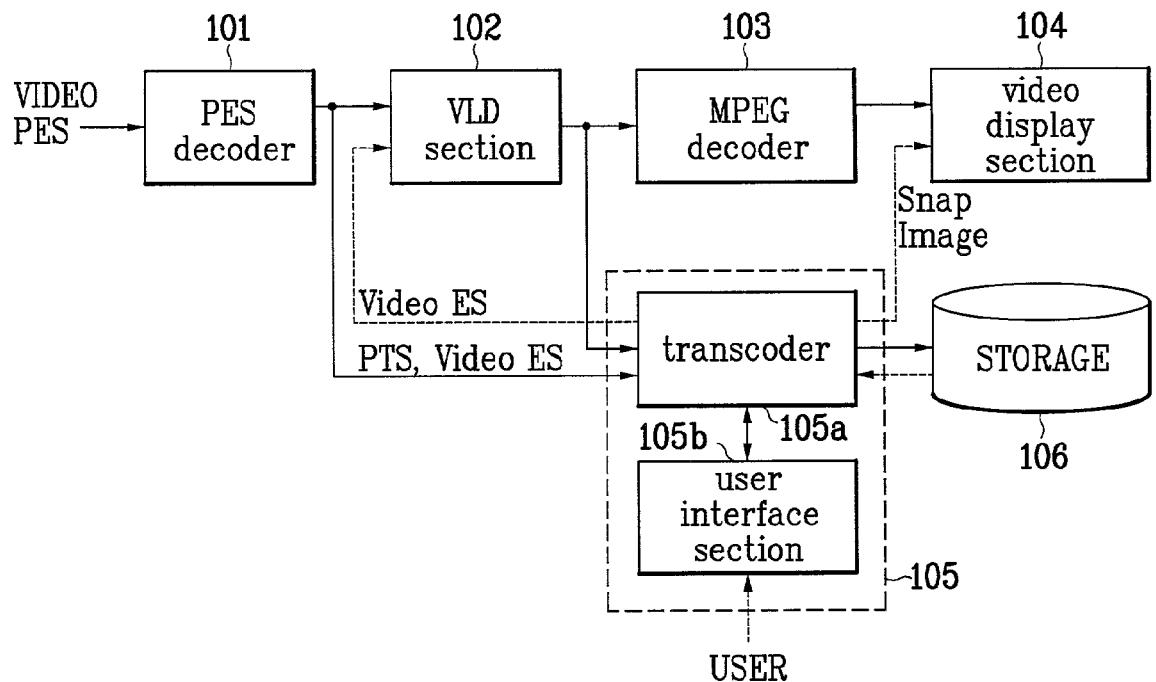
FIG. 1 is a block diagram of an apparatus for transcoding a video snap image according to the present invention.

FIG. 1 is a block diagram of an apparatus for transcoding a video snap image according to the present invention.

The apparatus includes a packetized elementary stream (PES) decoder 101 for decoding and separating a video PES into a video elementary stream (ES) and a presentation time stamp (PTS), a variable length decoding (VLD) section 102 for performing a VLD with respect to the video ES outputted from the PES decoder 101 or the video ES reproduced through a storage device 106, a video decoder 103 for restoring the variable-length-decoded bit stream to an original image through an inverse discrete cosine transform (IDCT) and inverse quantization, a video display section 104 for processing the image outputted from the video decoder 103 or a snap image to match with a display format and displaying the processed image, and a snap image processing section 105 for storing the video ES outputted from the PES decoder in the following storage device 106, or transcoding the video ES to the snap image and storing the snap image in the storage device 106.

Here, the PTS is time management information of a reproduced output. If the first portion of an access unit is included in a packet, the PTS is added to a packet header, while if not, the PTS is not added to the packet header.

Figure 2:
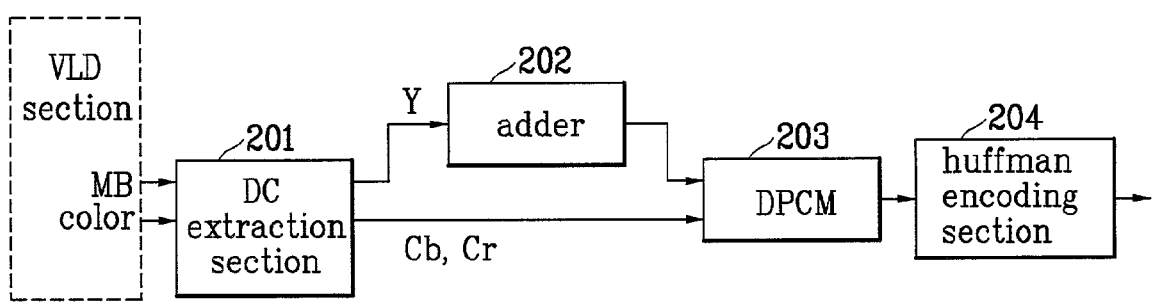
FIG. 2 is a block diagram of a snap image processing section in FIG. 1.

FIG. 2 is a block diagram of a transcoding section 105a of the snap image processing section 105 in FIG. 1.

The transcoding section 105a includes a DC extraction section 201 for extracting DC components from discrete cosine transform (DCT) coefficients of macro blocks outputted from the VLD section 102, an adder 202 for averaging the DC components of the macro blocks (i.e., four 8×8 macro blocks) if the DC component extracted by the DC extraction section 201 corresponds to a luminance, a differential pulse code modulation (DPCM) section 203 for obtaining and outputting a difference value between the DC component of the luminance averaged by the adder 202 or the DC component of a color outputted from the DC extraction section 201 and a previous DC component, and a Huffman encoding section 204 for Huffman-encoding the difference value outputted from the DPCM section 203.

The reference numeral 105b denotes a user interface section in the snap image processing section 105, which interfaces an operation according to a user's input, i.e., a user's selection of storage, reproduction, search, etc., to the transcoding section 105a.

In the present invention as constructed above, the PES decoder 101 separates the input video PES into the video ES, the PTS, etc., by parsing the input video PES, and then outputs the separated video ES and the PTS to the snap image processing section 105.

The VLD section 102 separates the input video ES into a picture type, color type, DCT coefficients, etc., by variable-length-decoding the video ES, and outputs them to the video decoder 103 and the snap image processing section 105 in the unit of a macro block.

At this time, a path of data outputted from the PES decoder 101 is changed according as the input image is to be displayed, stored in the storage device 106 such as the HDD, or converted into the snap image and stored in the storage device 106.

Specifically, in FIG. 1, a solid line indicates a path for storing the input video PES in the storage device 106 in the form of a video ES in the unit of a picture through the PES decoder 101 and the snap image processing section 105. A dotted line indicates another path for a user's reproduction and viewing of the stored video ES or the snap image through a search device.

For instance, in case that the input image is stored in the storage device 106 such as the HDD, the video ES, the PTS, etc., parsed by the PES decoder 101 are outputted to the storage device 106 through the snap image processing section 105. In case that the input image is changed to the snap image and then stored in the storage device 106, the macro blocks variable-length-decoded by the VLD section 102 are outputted to the snap image processing section 105, converted into the snap image, and then outputted to the storage device 106.

Also, in case that the input image is displayed in the display device, the signal variable-length-decoded by the VLD section 102 is outputted to the video display section 104 through the video decoder 103.

Meanwhile, in case that the input image stored in the storage device is displayed, the video ES stored in the storage device 106 is outputted to the video decoder 102 through the snap image processing section 105, and the snap image is outputted to the video display section 104 through the snap image processing section 105.

The video decoder 103 performs the IDCT and the inverse quantization (IQ) with respect to the bit stream outputted from the VLD section 102 in the unit of an 8×8 block to match with the typical MPEG-2 video syntax.

At this time, if the input bit stream corresponds to an intra-picture (I-picture), the result of IQ/IDCT is directly outputted to the video display section 104, and if the input bit stream corresponds to a predictive picture (P-picture) or a bi-directional picture (B-picture), motion-compensated blocks and the result of IDCT are combined and then outputted to the video display section 104.

In FIG. 1, the VLD section 102 and the video decoder are separated, but the video decoder generally includes the VLD section 102 and the video decoder 103.

In the present invention, the VLD section 102 and the video decoder 103 are separately illustrated to obtain the snap image from the output of the VLD section 102.

Specifically, the DC extraction section 201 of the transcoder 105a of the snap image processing section 105 in FIG. 2 receives the picture type, color type, and DCT coefficients from the VLD section 102 in the unit of a macro block, and then extracts only the DC components from the DCT coefficients of the I-picture.

Also, the DC extraction section 201 discriminates whether the extracted DC component corresponds to the luminance (Y) or the color (C). If the extracted DC component corresponds to the luminance, the DC extraction section 201 outputs the extracted DC component to the adder, while if the extracted DC component corresponds to the color, it outputs the extracted DC component directly to the DPCM section 203.

The adder obtains the average of the DC values with respect to four macro blocks of 8×8, and outputs the average value to the DPCM section 203.

Figure 3:
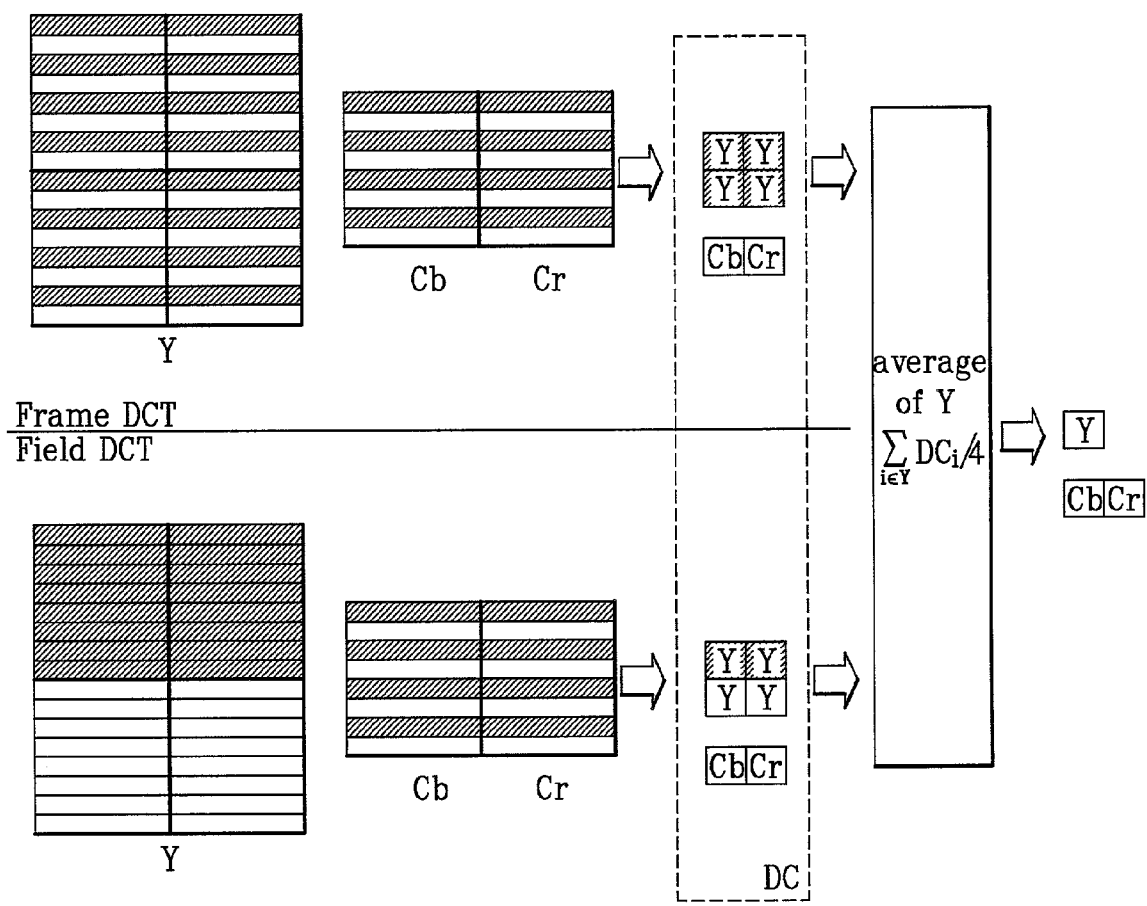
FIG. 3 is a view illustrating an example of a DC extraction process in one macro block of an interlaced scanning sequence performed by a DC extraction section of FIG. 2.

That is, as shown in FIG. 3, in the interlaced scanning sequence, the top/bottom signal of the luminance has a different structure according to the DCT type (for example, frame DCT and field DCT).

However, the average value in the unit of a frame is obtained by averaging four luminance blocks by the adder 202, and this results in the constant values for each macro block.

In other words, by obtaining the DC values for four blocks, the inconsistency of the picture structure, i.e., the deviation of the top/bottom position, can be solved.

Also, the compression rate can be reduced through the reduction of the storage capacity and the estimation error produced during the DPCM operation.

The DPCM section 203 obtains the difference value between the obtained DC value and the DC value of the previous macro block for each Y/C signal, and outputs the difference value to the Huffman encoding section 204. The Huffman encoding section 204 heightens the compression rate by performing the Huffman encoding.

Specifically, the DPCM section 203 obtains the difference between the DC components of the present and previous macro blocks with respect to the Y/C signal for each macro block. The Huffman encoding section 204 applies the Huffman code to the difference value in a manner that a small number of bits are allocated to a frequently appearing value, and a large number of bits are allocated to a rarely appearing value to reduce the whole number of bits. The Huffman-encoded values are stored in the storage device 106.

At this time, since the DC change among the macro blocks of the HD class image is not great, a good compression rate can be obtained.

Also, the DPCM section 203 performs the DPCM in the unit of a slice.

Here, the slice is a line unit in the video snap image.

This is because in case of performing a one-dimensional DPCM, the DC value of the last macro block in a horizontal direction is quite different from that of the first macro block in the horizontal direction in the next slice.

As described above, the DPCM section 203 performs the one-dimensional DPCM by determining the pixels in the horizontal direction of a picture in the unit of a slice during encoding the DC image, and at this time, the first pixel has a pixel value from which 128 is subtracted.

Then, the difference between the present pixel value and the previous pixel value is Huffman-encoded.

Figure 4:
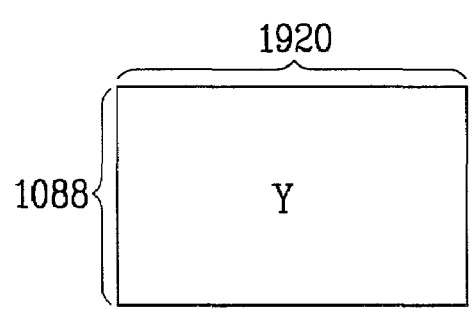
FIG. 4 is a view illustrating an example of a frame structure of an MPEG-2 frame and that of a snap image frame obtained by transcoding the MPEG-2 frame.
Figure 4:
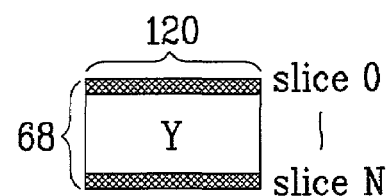
Figure 4:
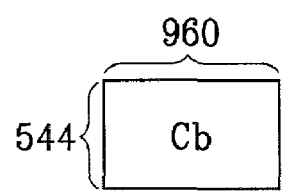
Figure 4:
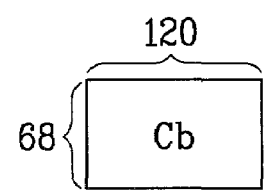
Figure 4:
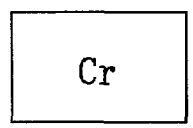
Figure 4:
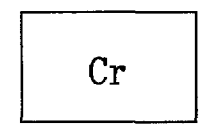

FIG. 4 shows an example of the picture size of an interlaced scanning image of 1920×1080 and the picture size of the snap image converted from the interlaced scanning image through the transcoder 105a of the snap image processing section 105.

The frame size after the transcoding is about 1/256 times smaller than the existing picture size.

This is because the purpose of the search device is to simply view the contents of the image or to skip to a desired position rather than to view the image in detail.

At this time, in searching the stored image as shown in FIG. 1, the snap image stored in the storage device 106 can be viewed through an on-screen display (OSD) or the video display section 104.

Also, the video snap image is displayed only as the intra-picture, and thus is used for the rapid search.

Figure 5:
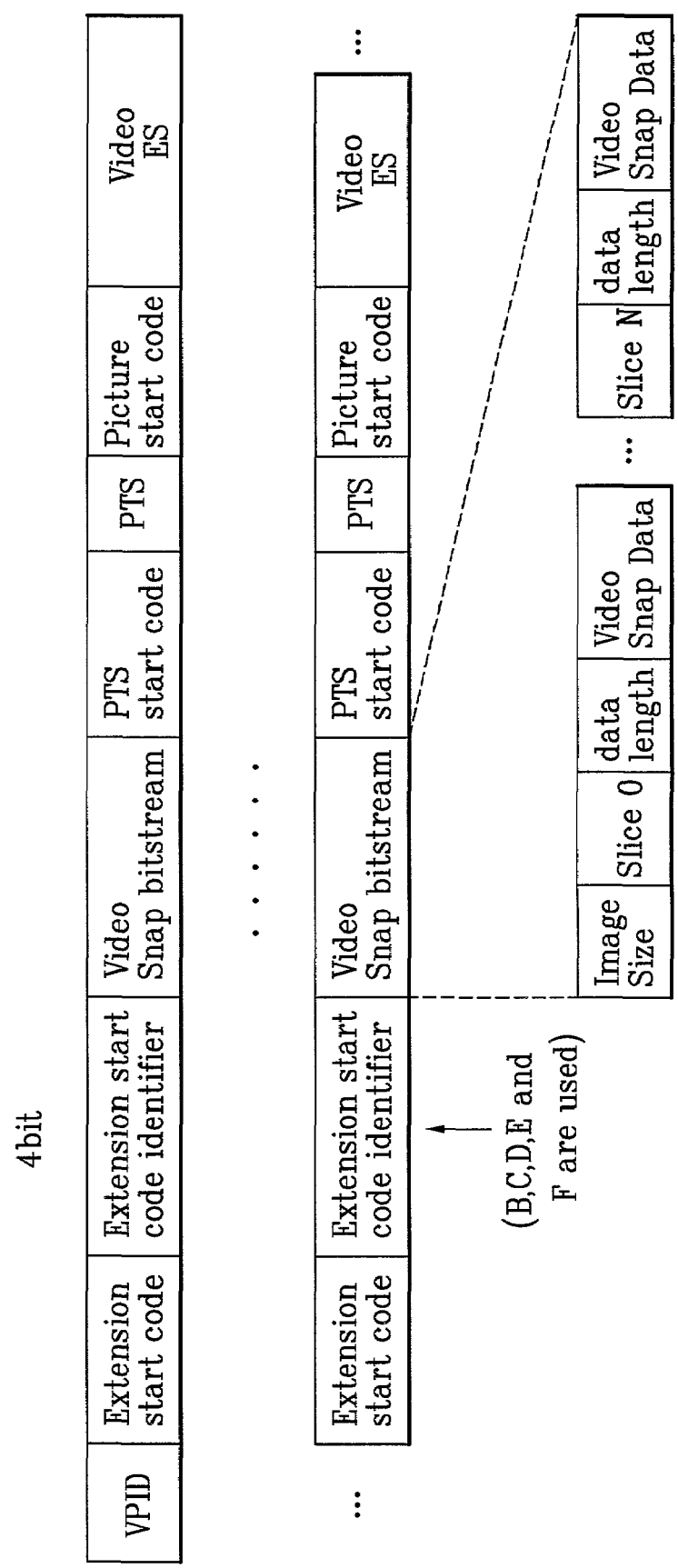
FIG. 5 is a view illustrating the structure of a bit stream database to be stored in a storage device in FIG. 1.

At this time, as shown in FIG. 5, the bit stream of the snap image compressed through the transcoder 105a of FIG. 2 is packetized with the video ES, and then stored in the storage device 106.

FIG. 5 shows the database structure of the snap image and the video ES stored in the storage device 106 such as the HDD.

Referring to FIG. 5, when the video ES is to be reproduced in detail at the position of the sequence searched through the snap image after the video ES and the snap image are stored in the storage device 106, the video ES and the snap image are multiplexed and stored in the storage device 106 so that the video ES can be directly reproduced through the video decoder without additional hardware.

That is, the video ES and the snap image do not exist as independent databases, but are combined together.

At this time, the snap images are distinctively stored without affecting the existing MPEG syntax using the extension_start_code and the extension_start_code_identifier on the MPEG-2 syntax.

The bit stream of the snap image is composed of an image size, positional information of a slice 0 to slice N, data length, and video snap data in the unit of a Huffman-encoded slice.

As described above, the bit stream of the snap image and the video ES are connected together to be stored as one signal train in the storage device 106, and this results in the following advantages.

First, if the reproduction is selected at a desired portion of the video snap image, the video ES at the position can be directly reproduced.

Specifically, the snap image is composed of only the I-picture, and its position is just before the video ES. Thus, if the detailed reproduction is desired at the position when the snap image is displayed, the user may select either of the direct reproduction or the video snap image being displayed.

Since the original MPEG video bit stream indicates the intra picture, the following video ES is decoded by the VLD section 102 and the video decoder 103, and then displayed on the display device.

That is, the reproduction is directly performed without the necessity of searching the desired display position.

Second, since the extension_start_code on the MPEG-2 syntax is used for the discrimination of the snap image, the video ES stored in the storage device 106 can be directly inputted to the video decoder 103 without any problem.

That is, it is not required to separately remove the bit stream of the snap image from the bit stream inputted to the video decoder 103.

For this, the snap image does not use the extension_start_code_identifier used in the video decoder 103.

The present invention proposes the use of one among the extension_start_code_identifiers B, C, D, E, and F remaining as spares on the MPEG syntax.

Thus, the video decoder 103 confirms the extension start_code_identifier in the input video ES, and if it is an unused signal on the MPEG syntax, for instance, if it is one among B, C, D, E, and F, the video decoder 103 skips the signal without performing the decoding.

Meanwhile, the video ES to be stored in the storage device 106 is stored together with the PTS. This is because the PTS is required during the reproduction of the video ES.

That is, since the decoding order of the MPEG bit stream is different from the displaying order thereof, the PTS is the signal required for the decoding and displaying operation in the determined order.

Also, the PTS signal is very important to overflow or underflow of a video buffer (not illustrated) in the video decoder 103.

Thus, by separately using a PTS_start_code, the PTS signal is stored along with the video ES in the picture unit.

As a result, the PTS enables the video ES to be decoded to match with the determined order without malfunction of the video buffer.

That is, the display time of the following decoded images is adjusted using the PTS, and thus a stable buffer control can be obtained.

The present invention can be built in a TV receiver or a set top box having a storage device such as an HDD.

Also, the present invention is an essential technique to the application fields such as a digital TV receiver or a digital video cassette recorder (VCR) having a built-in storage device, and has a great effect on solidification of the technical competitiveness.

The present invention is also applicable to the implementation of various kinds of video servers and private video recorders.

As described above, according to the apparatus for transcoding a video snap image according to the present invention, only the video snap image is preferentially decoded during the video search, and the contents of a desired video image can be searched more easily and rapidly.

Also, in a skip mode to the desired contents, if the snap image is selected when the desired snap image is displayed, the video image is decoded and reproduced just from the position without additional hardware.

Also, the stable control of the buffer can be obtained by adjusting the display time of the following decoded images using the PTS.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for transcoding a video snap image comprising:
   a video decoder for performing a variable length decoding (VLD), inverse discrete cosine transform (IDCT), and inverse quantization with respect to an input video bit stream to display the decoded bit steam;
   a DC extraction section for extracting DC components from discrete cosine transform (DCT) coefficients of variable-length-decoded macro blocks;
   an adder for averaging the extracted DC components;
   a differential pulse code modulation (DPCM) section for obtaining and outputting a difference value between the DC component averaged by the adder or the DC component outputted from the DC extraction section and a DC component of a previous macro block, wherein the DPCM section obtains the difference value between the DC component of a color extracted by the DC extraction section and the DC component of a color of the previous macro block;
   a Huffman encoding section for Huffman-encoding the difference value outputted from the DPCM section; and
   a storage device for storing a Huffman-encoded snap image and the video bit stream as one signal train.

2. The apparatus as claimed in claim 1, wherein if the extracted DC components correspond to a luminance, the adder averages the extracted DC components of the luminance.

3. An apparatus for transcoding a video snap image comprising:
   a video decoder for performing a variable length decoding (VLD), inverse discrete cosine transform (IDCT), and inverse quantization with respect to an input video bit stream to display the decoded bit stream;
   a DC extraction section for extracting DC components from discrete cosine transform (DCT) coefficients of variable-length-decoded macro blocks;
   an adder for averaging the extracted DC components;
   a differential pulse code modulation (DPCM) section for obtaining and outputting a difference value between the DC component averaged by the adder or the DC component outputted from the DC extraction section and a DC component of a previous macro block, wherein the DPCM section obtains the difference value between the DC component of a luminance averaged by the adder and the DC component of a luminance of the previous macro block;
   a Huffman encoding section for Huffman-encoding the difference value outputted from the DPCM section; and
   a storage device for storing a Huffman-encoded snap image and the video bit stream as one signal train.

4. The apparatus as claimed in claim 1, wherein the DCT coefficients used for extracting the DC components through the DC extraction section comprise DCT coefficients of an intra (I)-picture.

5. The apparatus as claimed in claim 1, wherein the DPCM section performs the DPCM in the unit of a slice.

6. An apparatus for transcoding a video snap image comprising:
   a video decoder for performing a variable length decoding (VLD), inverse discrete cosine transform (IDCT), and inverse quantization with respect to an input video bit stream to display the decoded bit stream;
   a DC extraction section for extracting DC components from discrete cosine transform (DCT) coefficients of variable-length-decoded macro blocks;
   an adder for averaging the extracted DC components;
   a differential pulse code modulation (DPCM) section for obtaining and outputting a difference value between the DC component averaged by the adder or the DC component outputted from the DC extraction section and a DC component of a previous macro block;
   a Huffman encoding section for Huffman-encoding the difference value outputted from the DPCM section; and
   a storage device for storing a Huffman-encoded snap image and the video bit stream as one signal train, wherein the video bit stream and the snap image bit stream to be stored in the storage device are connected together to be stored as the one signal train, and are discriminated from each other using an unused extension_start_code_identifier on an MPEG-2 syntax.

7. The apparatus as claimed in claim 6, wherein the bit stream of the snap image to be stored in the storage device is composed of an image size, positional information of each slice, data length, and video snap data in the unit of a Huffman-encoded slice.

8. The apparatus as claimed in claim 6, wherein the video bit stream to be stored in the storage device is composed of a presentation time stamp (PTS) and a video elementary stream (ES) in the unit of a picture.

9. The apparatus as claimed in claim 6, wherein if a user selects the snap image being displayed, the video decoder decodes and displays the video bit stream stored in the next position of the snap image being displayed.

10. The apparatus as claimed in claim 9, wherein the video decoder confirms the extension_start_code_identifier from the input video bit stream, and then if the identifier is an identifier that is not used on the MPEG syntax, the video decoder skips the video bit stream indicated by the identifier without decoding the bit stream.

11. A method of transcoding a video snap image comprising the steps of:
variable-length-decoding an input video bit stream in the unit of a macro block;
extracting DC components from discrete cosine transform (DCT) coefficients of variable-length-decoded macro blocks;
obtaining a difference value between the extracted DC component and a DC component of a previous macro block, wherein obtaining the difference value between the extracted DC component and the DC component of the previous macro block includes if the extracted DC component corresponds to a luminance, averaging the extracted DC components of the luminance, and then obtaining the difference value between the averaged DC component of the luminance and the DC component of the luminance of the previous macro block; and
Huffman-encoding the difference value.

12. A method of transcoding a video snap image comprising the steps of:
variable-length-decoding an input video bit stream in the unit of a macro block;
extracting DC components from discrete cosine transform (DCT) coefficients of variable-length-decoded macro blocks;
obtaining a difference value between the extracted DC component and a DC component of a previous macro block, wherein obtaining the difference value between the extracted DC component and the DC component of the previous macro block includes if the extracted DC component corresponds to a color, obtaining the difference value between the extracted DC component of the color and the DC component of the color of the previous macro block; and
Huffman-encoding the difference value.

13. The method as claimed in claim 11, wherein at the step of extracting the DC components, the DCT coefficients from which the DC components are extracted are DCT coefficients of an intra (I)-picture.

14. The method as claimed in claim 11, wherein the step of obtaining the difference value is performed in the unit of a slice.

15. The method as claimed in claim 11, further comprising combining a Huffman-encoded snap image and information of the video bit stream.

16. The method as claimed in claim 15, wherein the Huffman-encoded snap image and the information of the video bit stream are combined as one signal train.

17. The method as claimed in claim 16, further comprising storing the one signal train in a storage device.

18. The method as claimed in claim 11, wherein the input video bit stream comprises an MPEG video stream.

19. The apparatus as claimed in claim 1, wherein the input video bit stream comprises an MPEG video stream.

20. An apparatus comprising:
a video decoder to perform a variable length decoding, inverse discrete cosine transform, and inverse quantization of an input video bit stream;
an extraction section to extract DC components from discrete cosine transform coefficients of variable-length-decoded macro blocks;
an adder to average the extracted DC components, wherein the adder averages the extracted DC components of a luminance if the extracted DC components correspond to the luminance;
a differential pulse code modulation section to output a difference value based on a DC component of a previous macro block;
an encoding section to encode the difference value output from the differential pulse code modulation section; and
a storage device to store a single bit stream including an encoded snap image and information of the video bit stream.

21. An apparatus comprising:
a video decoder to perform a variable length decoding, inverse discrete cosine transform, and inverse quantization of an input video bit stream;
an extraction section to extract DC components from discrete cosine transform coefficients of variable-length-decoded macro blocks;
an adder to average the extracted DC components;
a differential pulse code modulation section to output a difference value based on a DC component of a previous macro block, wherein the differential pulse code modulation section obtains the difference value between a DC component of a luminance averaged by the adder and the DC component of a luminance of the previous macro block;
an encoding section to encode the difference value output from the differential pulse code modulation section; and
a storage device to store a single bit stream including an encoded snap image and information of the video bit stream.

22. An apparatus comprising:
a video decoder to perform a variable length decoding, inverse discrete cosine transform, and inverse quantization of an input video bit stream;
an extraction section to extract DC components from discrete cosine transform coefficients of variable-length-decoded macro blocks;
an adder to average the extracted DC components;
a differential pulse code modulation section to output a difference value based on a DC component of a previous macro block, wherein the differential pulse code modulation section obtains the difference value between a DC component of a color extracted by the DC extraction section and the DC component of a color of the previous macro block;

an encoding section to encode the difference value output from the differential pulse code modulation section; and a storage device to store a single bit stream including an encoded snap image and information of the video bit stream.

23. An apparatus comprising:

a video decoder to perform a variable length decoding, inverse discrete cosine transform, and inverse quantization of an input video bit stream;

an extraction section to extract DC components from discrete cosine transform coefficients of variable-length-decoded macro blocks;

an adder to average the extracted DC components;

a differential pulse code modulation section to output a difference value based on a DC component of a previous macro block;

an encoding section to encode the difference value output from the differential pulse code modulation section;

a storage device to store a single bit stream including an encoded snap image and information of the video bit stream; and a device to connect the video bit stream and the snap image bit stream to be stored in the storage device as the single bit stream.

24. The apparatus as claimed in claim 23, wherein the bit stream of the snap image to be stored in the storage device includes information of an image size, a positional information of each slice, a data length, and video snap data in a unit of an encoded slice.

25. The apparatus as claimed in claim 23, wherein the video bit stream to be stored in the storage device includes information of a presentation time stamp (PTS) and a video elementary stream (ES) in a unit of a picture.

26. The apparatus as claimed in claim 20, wherein the input video bit stream comprises an MPEG video stream.

* * * * *